United States Patent
Gomez et al.

(10) Patent No.: US 9,252,829 B2
(45) Date of Patent: Feb. 2, 2016

(54) POWER SAVINGS WITHIN COMMUNICATION SYSTEMS

(71) Applicant: BROADCOM CORPORATION, Irvine, CA (US)

(72) Inventors: Ramon A. Gomez, San Juan Capistrano, CA (US); Thomas J. Kolze, Phoenix, AZ (US)

(*) Notice: Subject to any disclaimer, the term of this patent is extended or adjusted under 35 U.S.C. 154(b) by 239 days.

(21) Appl. No.: 14/037,625

(22) Filed: Sep. 26, 2013

(65) Prior Publication Data

US 2014/0086128 A1    Mar. 27, 2014

Related U.S. Application Data

(60) Provisional application No. 61/706,087, filed on Sep. 26, 2012, provisional application No. 61/706,503, filed on Sep. 27, 2012, provisional application No. 61/876,527, filed on Sep. 11, 2013.

(51) Int. Cl.
| | |
|---|---|
| *H04W 4/00* | (2009.01) |
| *H04B 1/401* | (2015.01) |
| *H04W 52/02* | (2009.01) |

(52) U.S. Cl.
CPC .............. *H04B 1/401* (2013.01); *H04W 52/02* (2013.01); *H04W 52/0209* (2013.01); *H04W 52/0245* (2013.01)

(58) Field of Classification Search
CPC .................................. H04B 1/40; H04B 1/401
USPC .......................................... 370/311; 455/90.2
See application file for complete search history.

(56) References Cited

U.S. PATENT DOCUMENTS

| | | | |
|---|---|---|---|
| 2005/0255815 A1* | 11/2005 | Hammerschmidt | H03G 3/3078 455/132 |
| 2011/0228881 A1* | 9/2011 | Oren | H04B 1/1027 375/316 |
| 2012/0161878 A1* | 6/2012 | Joly | H03F 1/0211 330/296 |
| 2013/0034139 A1* | 2/2013 | Khlat | H03F 1/0227 375/224 |
| 2013/0137386 A1* | 5/2013 | Sivonen | H04B 1/109 455/90.2 |
| 2013/0191663 A1* | 7/2013 | Overcash | G06F 1/3209 713/320 |
| 2014/0169502 A1* | 6/2014 | Lovell | H04L 5/0007 375/324 |

* cited by examiner

*Primary Examiner* — Farah Faroul
(74) *Attorney, Agent, or Firm* — Garlick & Markison; Shayne X. Short

(57) ABSTRACT

A communication device is implemented to perform signal processing based on different dynamic ranges at different times. The device can operate with a first, relatively larger dynamic range during normal operations, and with a second, relatively smaller dynamic range during reduced power or sleep mode operations. The relatively smaller dynamic range may have a relatively higher noise floor than the larger dynamic range. Generally, any desired number of different dynamic ranges may be used at different times and based on different operating conditions. The communication device can include functionality associated with two or more transceivers to support communications based on two or more power modes (e.g., a full power mode, a reduced power mode or a sleep mode, etc.). The communication device may alternatively include two or more separate transceivers to support such communications. An unused transceiver or transceiver functionality may be turned off to provide power savings.

20 Claims, 8 Drawing Sheets

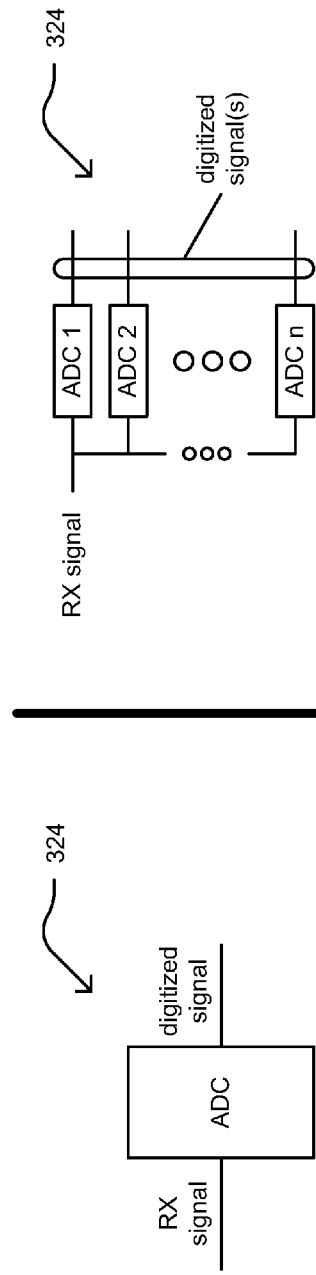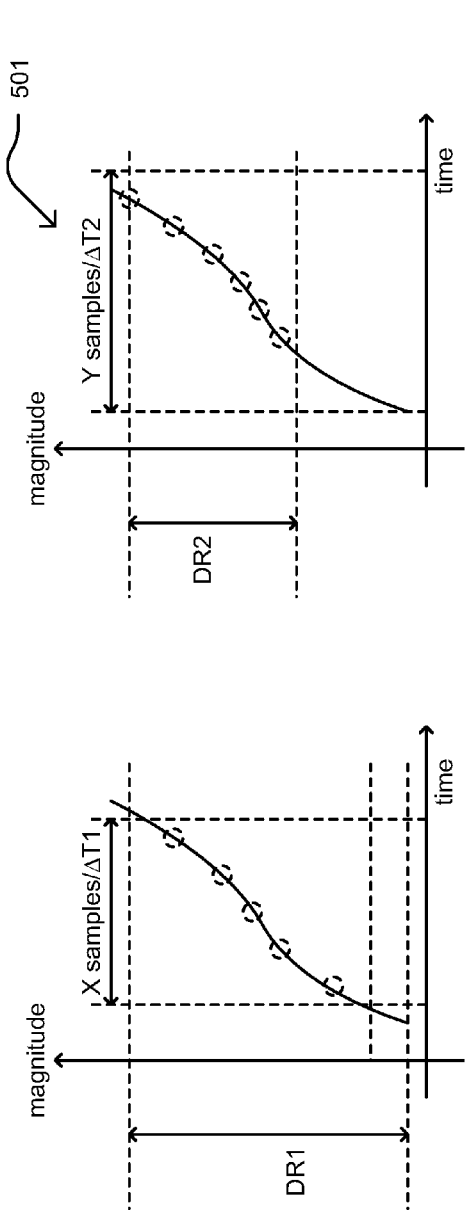
FIG. 5A
FIG. 5B
FIG. 5C

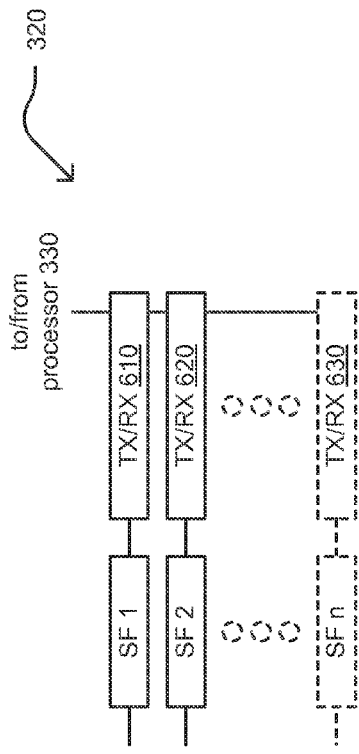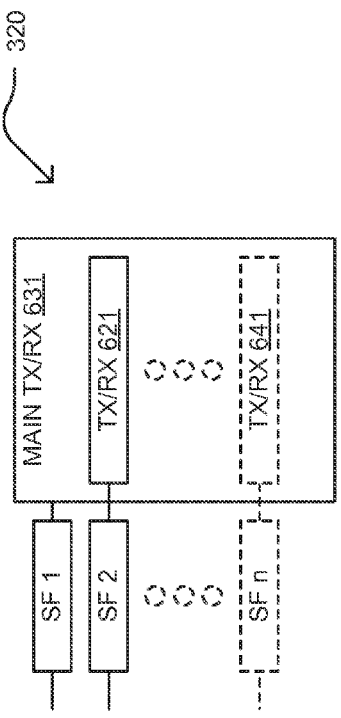

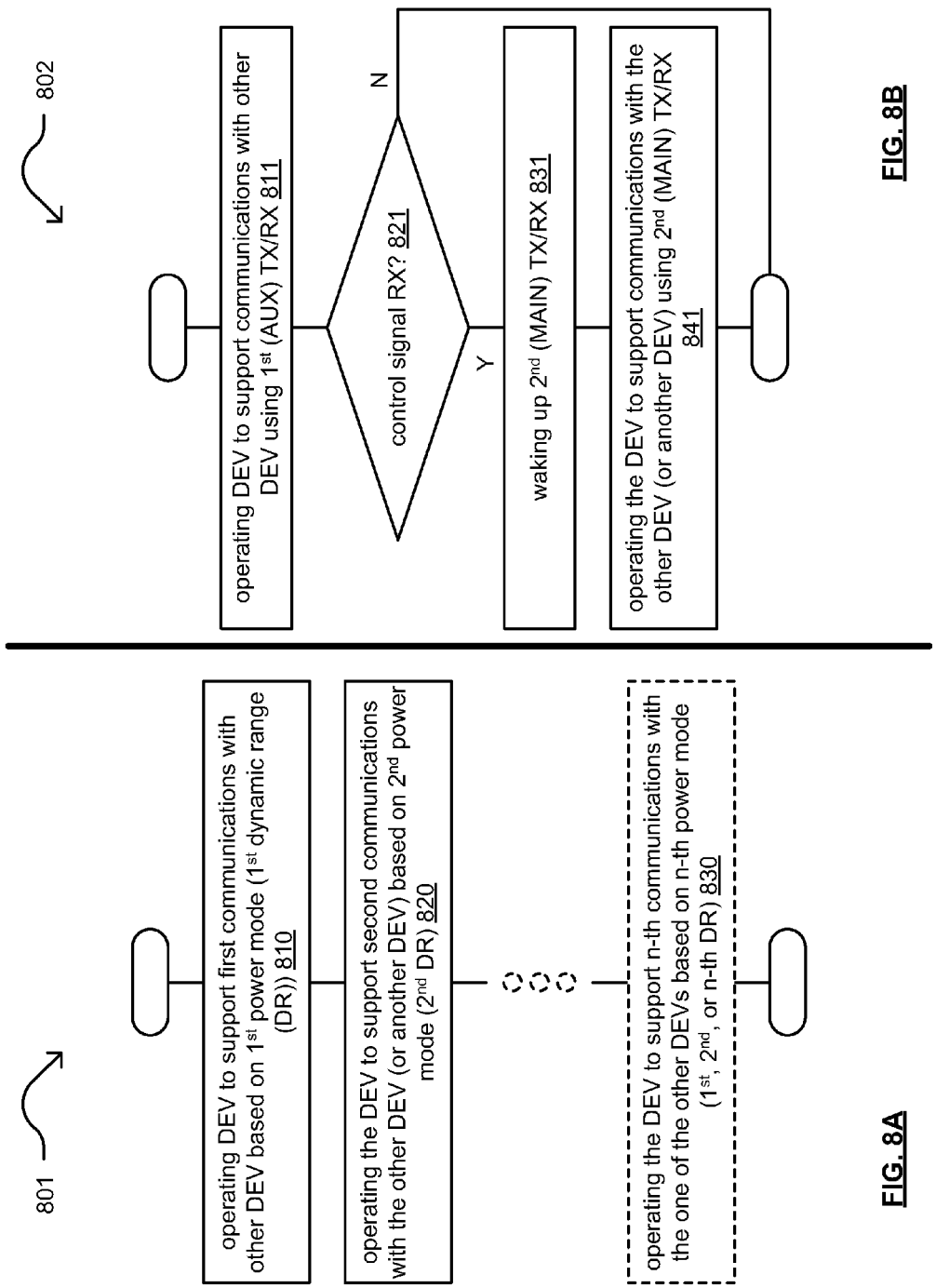

POWER SAVINGS WITHIN COMMUNICATION SYSTEMS

CROSS REFERENCE TO RELATED PATENTS/PATENT APPLICATIONS

Provisional Priority Claims

The present U.S. Utility patent application claims priority pursuant to 35 U.S.C. §119(e) to the following U.S. Provisional Patent Applications which are hereby incorporated herein by reference in their entirety and made part of the present U.S. Utility patent application for all purposes:

1. U.S. Provisional Patent Application Ser. No. 61/706,087, entitled "Power savings within communication systems," filed Sep. 26, 2012, pending.

2. U.S. Provisional Patent Application Ser. No. 61/706,503, entitled "Power savings within communication systems," filed Sep. 27, 2012, pending.

3. U.S. Provisional Patent Application Ser. No. 61/876,527, entitled "Power savings within communication systems," filed Sep. 11, 2013, pending.

BACKGROUND

1. Technical Field

The present disclosure relates generally to communication systems; and, more particularly, to power saving operations of communication devices within such communication systems.

2. Description of Related Art

Data communication systems have been under continual development for many years. The primary goal within such communication systems is to transmit information successfully between devices. Devices implemented within such systems are energized using one or both of battery power and wall power.

In recent years, there has been a great deal of effort dedicated to reducing the amount of energy consumed by electric powered devices, including communication devices. While the individual amount of energy consumed by any one communication device and an overall system may be relatively small, the overall energy consumed by multiple devices throughout the system can be very high. Power savings within communication devices can significantly reduce the amount of energy consumed within communication systems.

Battery-powered devices are particularly susceptible to performance degradation based on battery dissipation. A battery-powered device that better manages its available energy source can not only improve the quality of its performance but extend the duration of its performance.

BRIEF DESCRIPTION OF THE SEVERAL VIEWS OF THE DRAWINGS

FIG. 5A is a diagram illustrating an example of a portion of a receiver that includes an analog to digital converter (ADC).

FIG. 5B is a diagram illustrating another example of a portion of a receiver that includes multiple ADCs.

FIG. 5C is a diagram illustrating an example of a digital sampling of a signal using different operational parameters.

FIG. 6A is a diagram illustrating an example of a portion of a communication interface that includes multiple transceivers.

FIG. 6B is a diagram illustrating an example of a portion of a communication interface that includes a main transceiver with one or more sub-transceivers.

FIG. 8A is a diagram illustrating an embodiment of a method for execution by one or more communication devices.

FIG. 8B is a diagram illustrating another embodiment of a method for execution by one or more communication devices.

DETAILED DESCRIPTION

Figure 1:
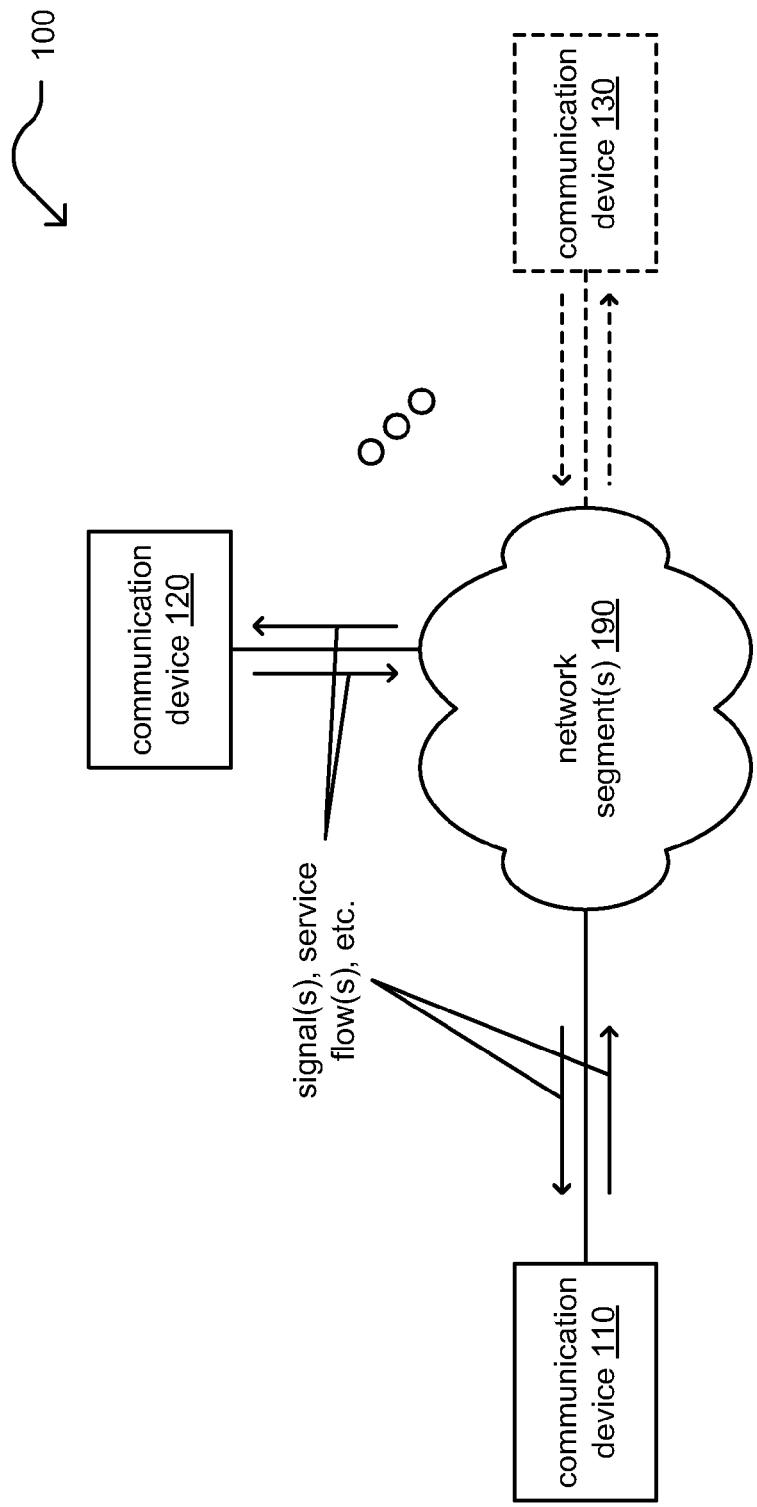
FIG. 1 is a diagram illustrating an embodiment of one or more communication systems.

FIG. 1 is a diagram illustrating an embodiment 100 of one or more communication systems. One or more network segments 190 provide communication inter-connectivity for at least two communication devices 110 and 120. Generally speaking, any desired number of communication devices are included within one or more communication systems (e.g., as shown by communication device 130). Some or all the various communication devices 110-130 include capability to operate within at least one power savings mode.

The various communication links within the one or more network segments 190 may be implemented using any of a variety of communication media including communication links implemented as wireless, wired, optical, satellite, microwave, etc. communication links. Also, in some instances, communication links of different types may cooperatively form a connection pathway between any two communication devices. Considering one possible example, a communication pathway between devices 110 and 120 may include some segments of wired communication links and other segments of optical communication links. Note also that the devices 110-130 may be of a variety of types of devices including stationary devices, mobile devices, portable devices, etc. and may support communications for any of a number of services or service flows including data, telephony, television, Internet, media, synchronization, etc.

In an example of operation, device 110 includes a communication interface to support communications with one or more of the other devices 120-130. This communication may be bidirectional/to and from the one or more of the other devices 120-130 or unidirectional (or primarily unidirectional) from the one or more of the other devices 120-130. The device 110 includes a processor that is configured to direct the communication interface to operate using various power modes and various dynamic ranges. For example, when the device 110 operates in a first power mode, the communication interface uses the first dynamic range. When the device 110 operates in a second power mode, the communication interface uses a second dynamic range. One of the dynamic ranges may have a relatively higher noise floor than another of the dynamic ranges. The device 110 can operate in a reduced power mode by using a dynamic range that is relatively smaller than another dynamic range.

Figure 2:
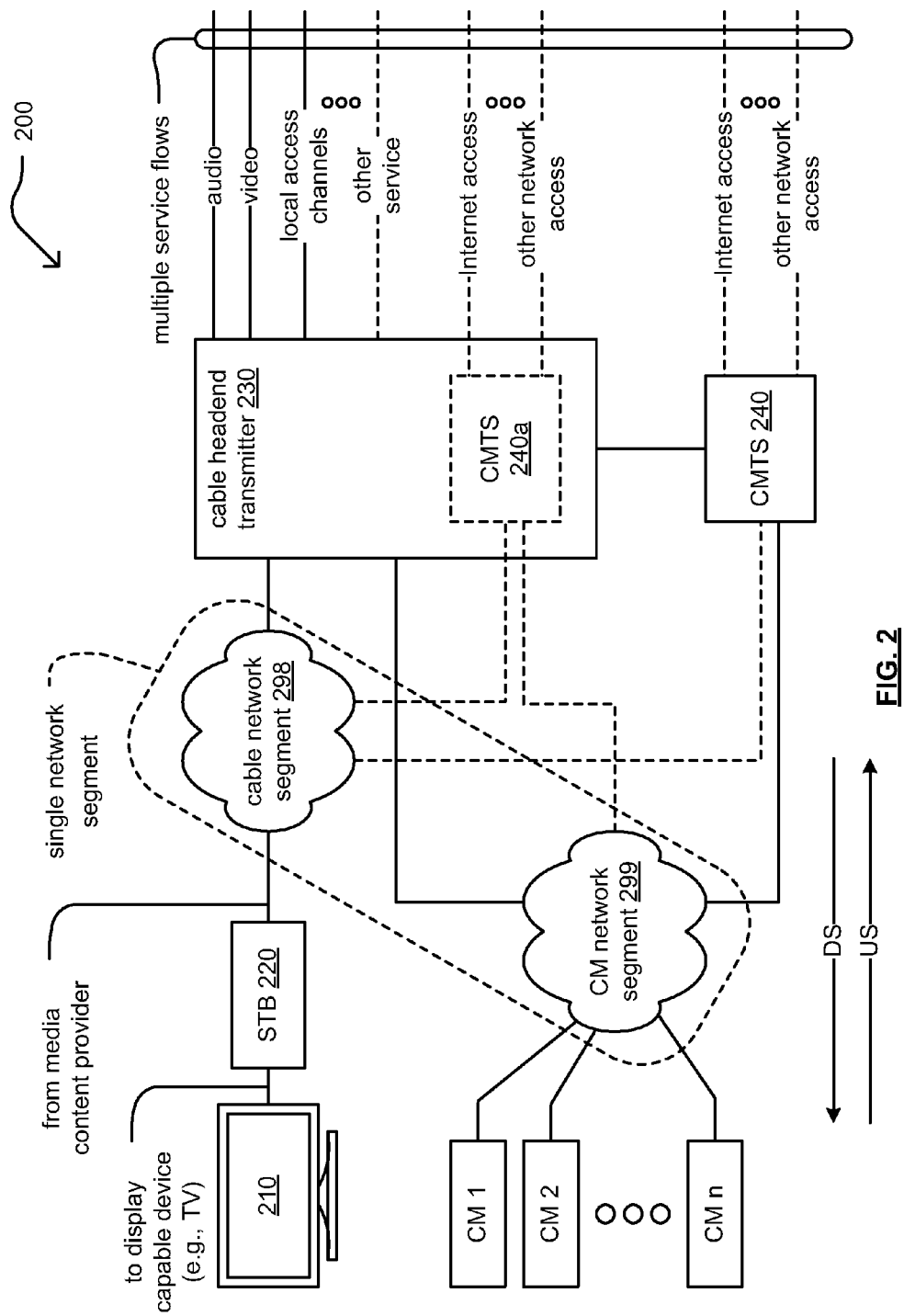
FIG. 2 is a diagram illustrating another embodiment of one or more communication systems.

FIG. 2 is a diagram illustrating another embodiment 200 of one or more communication systems. A cable headend transmitter 230 provides service to a set-top box (STB) 220 via cable network segment 298. The STB 220 provides output to a display capable device 210. The cable headend transmitter 230 can support any of a number of service flows such as audio, video, local access channels, as well as any other service of cable systems. For example, the cable headend transmitter 230 can provide media (e.g., video and/or audio) to the display capable device.

The cable headend transmitter 230 may provide operation of a cable modem termination system (CMTS) 240a. For example, the cable headend transmitter 230 may perform such CMTS functionality, or a CMTS may be implemented separately from the cable headend transmitter 230 (e.g., as shown by reference numeral 240). The CMTS 240 can provide network service (e.g., Internet, other network access, etc.) to any number of cable modems (shown as CM 1, CM 2, and up to CM n) via a cable modem (CM) network segment 299. The cable network segment 298 and the CM network segment 299 may be part of a common network or common networks. The cable modem network segment 299 couples the cable modems 1-n to the CMTS (shown as 240 or 240a). Such a cable system (e.g., cable network segment 298 and/or CM network segment 299) may generally be referred to as a cable plant and may be implemented, at least in part, as a hybrid fiber-coaxial (HFC) network (e.g., including various wired and/or optical fiber communication segments, light sources, light or photo detection complements, etc.).

A CMTS 240 (or 240a) is a component that exchanges digital signals with cable modems 1-n on the cable modem network segment 299. Each of the cable modems is coupled to the cable modem network segment 299, and a number of elements may be included within the cable modem network segment 299. For example, routers, splitters, couplers, relays, and amplifiers may be contained within the cable modem network segment 299. Generally speaking, downstream information may be viewed as that which flows from the CMTS 240 to the connected cable modems (e.g., CM 1, CM 2, etc.), and upstream information as that which flows from the cable modems to the CMTS 240.

At least some of the devices within this diagram are implemented to operate to perform power savings. For example, a cable modem may be configured to perform signal processing of signals received from the CMTS 240 (or 240a) using different dynamic ranges. The cable modem may include functionality associated with two or more transceivers or two or more separately implemented transceivers for different service flows supported with the CMTS 240 (or 240a). One of the transceivers or transceiver functionalities may be implemented as an auxiliary transceiver operating with relatively much lower power than other transceivers or transceiver functionalities. For example, such auxiliary transceiver capability may be used to support a low-rate control channel that has a data rate (e.g., in terms of symbols per second, bits per second, etc.) compared to a main communication channel with the CMTS 240 (or 240a). This low-rate control channel may be used to maintain synchronization with the CMTS 240 (or 240a) during one or more reduced power or sleep power modes and also to provide wake-up functionality to the main transceiver capability when the device operates in a power mode other than the one or more reduced power or sleep power modes.

For example, considering potential synchronization mismatches that may occur between a cable modem and the CMTS 240 (or 240a), a 1 part per million (PPM) frequency uncertainty of the cable modem's timebase may be assumed (e.g., based on free-running sleep, reduced power, etc. operational periods with no headend or CMTS 240 (or 240a) synchronization). In such an example, 1 nanosecond of timebase error may accumulate every 1 millisecond of free-run time, and synchronization for the CMTS 240 (or 240a) may impose a limit on the longest free-running intervals. As described herein by using one of the service flows for synchronization, such a free-running interval constraint can be removed. As also described herein, a device may include an auxiliary transceiver configured to maintain synchronization with another device within the system thereby eliminating any such possible synchronization mismatches.

Figure 3:
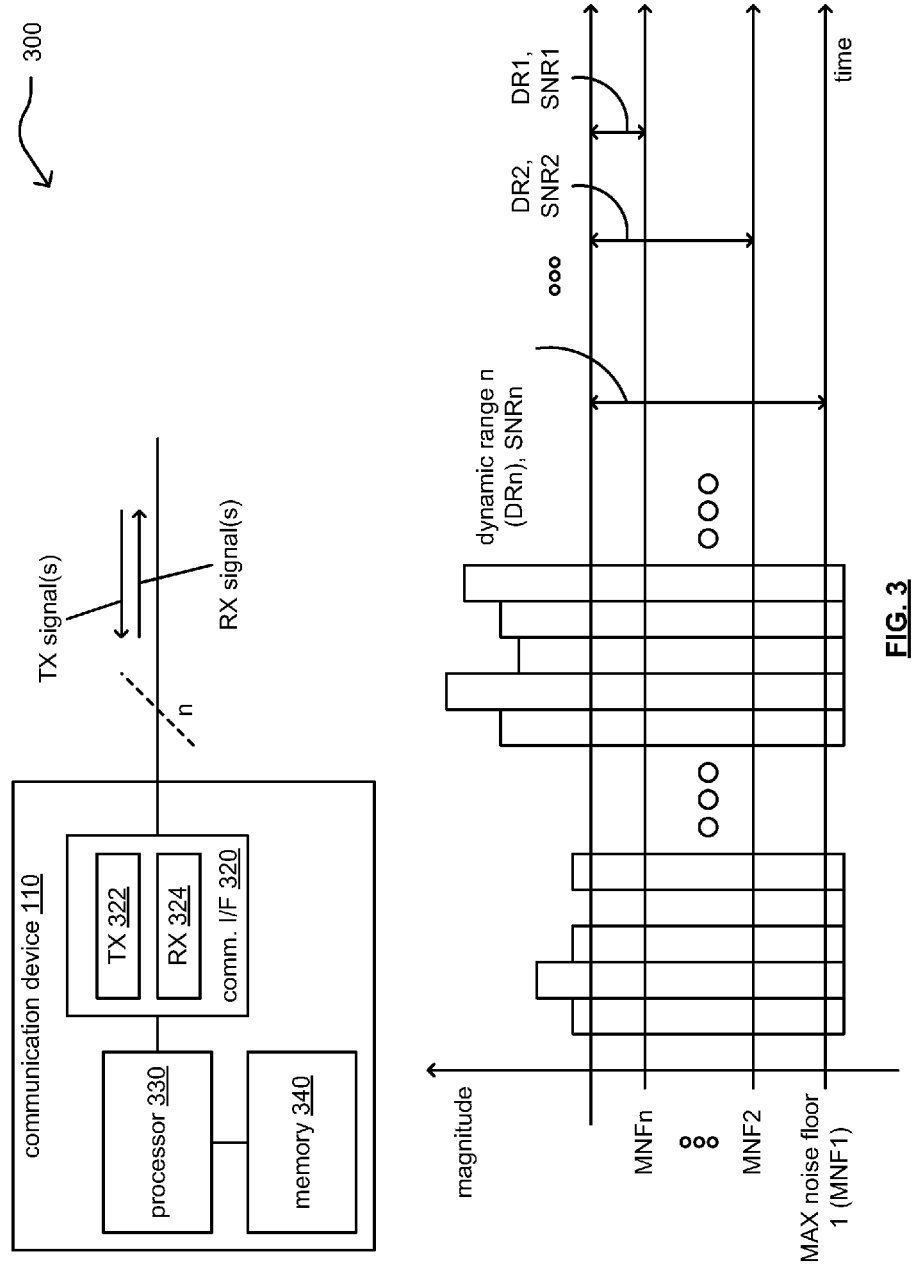
FIG. 3 is a diagram illustrating a communication device operative within one or more communication systems.

FIG. 3 is a diagram 300 illustrating a communication device 110 operative within one or more communication systems. The device 110 includes a communication interface 320 and a processor 330. The communication interface 320 includes functionality of a transmitter 322 and the receiver 324 to support communications with one or more other devices within a communication system. The device 110 may also include memory 340 to store information generated by the device 110 or information received from other devices via one or more communication channels. Memory 340 may also include and store various operational instructions for use by the processor 330 in regards to the interference identification and/or cancellation described herein. Memory 340 may also include and store information related to operational conditions including current, historical, and/or expected device and/or system operational conditions, current, historical, and/or expected service flows, etc. to assist in performing effective power saving operation.

The communication interface 320 is configured to support communications to and from one or more other devices. The processor 330 may be configured to direct the communication interface 320 to operate based on a first power mode that uses a first dynamic range and to operate based on a second power mode that uses a second dynamic range. The second dynamic range may be relatively smaller than the first dynamic range to ensure power savings when operating the device 110. The second dynamic range may also have a relatively higher noise floor than the first dynamic range. The device 110 will consume relatively less energy when operating based on a relatively smaller dynamic range.

When receiving a signal, the device 110 may select one dynamic range from a number of dynamic ranges. Considering the illustration at the bottom of the diagram, the device 110 having different magnitudes. The signals may be transmitted using time slice broadcasting, which is a time multiplexed signaling scheme that can include multiple bursts of information. The amount of information within different bursts can be different. The device 110 may process received signals using different dynamic ranges. For illustration, the different dynamic ranges (DRs) 1, 2, up through n are shown as being based on a common upper magnitude signal level. Note also that different dynamic ranges may alternatively have different upper magnitude signal levels (e.g., different dynamic ranges may span different portions or sub-ranges of the entire magnitude spectrum). The different dynamic ranges may have different maximum noise floors (MNFs 1, 2, up through n). A dynamic range having a relatively higher noise floor will have a relatively lower signal to noise ratio (SNR). For example, the relatively smaller dynamic range 1 will have a SNR 1 that is relatively smaller than the SNR 2 of dynamic range 2.

Signaling provided based on a relatively smaller dynamic range will generally be provided using a relatively lower rate and a relatively more robust modulation coding set (MCS) than signaling provided on a relatively higher dynamic range. For example, signaling provided using dynamic range 1 may be provided using X bits per second and a first MCS, and signaling provided using dynamic range 2 may be provided using Y bits per second and a second MCS. The rate of X bits per second may be relatively lower than the rate of Y bits per second. Also, the first MCS may be lower ordered than the second MCS such that the first MCS may include symbols having relatively fewer bits per symbol and one or more constellations having relatively fewer constellation points than the second MCS (e.g., the first MCS being quadrature phase shift keying (QPSK) and the second MCS being 16 quadrature amplitude modulation (QAM), 64 QAM, etc., or 32 amplitude phase shift keying (APSK), etc.).

The device 110 may operate using different dynamic ranges based on one or more device and/or system conditions. For example, the device 110 may operate based on a first power mode (e.g., a reduced power mode or a sleep mode) during a first time, and based on a second power mode (e.g., a full power mode) during a second time. The device 110 may operate within such a first power mode when not supporting communications within a given service flow with another device. For example, when the device 110 is not receiving information (e.g., data, media, etc.) from the other device, the device 110 may operate within the first power mode that supports synchronization with the other device. For example, the device 110 may communicate with the other device via a control channel to maintain synchronization with the other device so that when the device 110 communicates with the other device in a power mode, the two devices are in proper synchronization from the beginning. Also, when the device 110 receives communications from the other device via the control channel, the device 110 may wake up from a reduced power mode or a sleep mode to operate based on a full power mode. The communications supported via the control channel may be of a relatively lower rate and of a relatively lower ordered MCS than communications supported via another channel between the device 110 and the other device.

During normal operation, the device 110's communication interface 320 (e.g., one or more components of an analog front end (AFE) of such a device) may operate with a relatively larger dynamic range. However, when operating based on a reduced power sleep mode, the device 110's communication interface 320 may operate with a relatively higher receiver noise floor and correspondingly smaller dynamic range. With respect to the dynamic range operational mode and radio frequency (RF) receivers, various definitions are provided as follows:

$P_{max}$: maximum signal power including plant loading
$N_{max}$: required noise floor for sensitivity
Dynamic Range Requirement=$P_{max}/N_{max}$ Noted that values of $P_{max}$ and $N_{max}$ can occur concurrently (e.g., per the applicable specification based on Society of Cable Telecommunications Engineers 40 (SCTE40)). Certain implementations can operate using only values of $P_{max}$ and $N_{max}$ that do occur concurrently.

Considering dynamic range and transceiver or receiver power, the dynamic range determines factor such as hardware's power dissipation. Relatively speaking, frequency range and signal bandwidth are less important than dynamic range. Power may be viewed as being proportional to linear dynamic range (e.g., power being proportional to linear dynamic range, $10^{dB/10}$). Therefore, to operate in a reduced power mode, the device 110 may operate using a relatively lower dynamic range for processing received signals. A relatively low power auxiliary transceiver or transceiver functionality may be implemented within the device 110 to operate using on a lower dynamic range requirement. Note that this may be applied generally to all radio frequency (RF) transceiver (TX/RX) or receiver (RX) design architectures (e.g., including heterodyne/zero intermediate frequency (0-IF), full-band, etc.).

Figure 4:
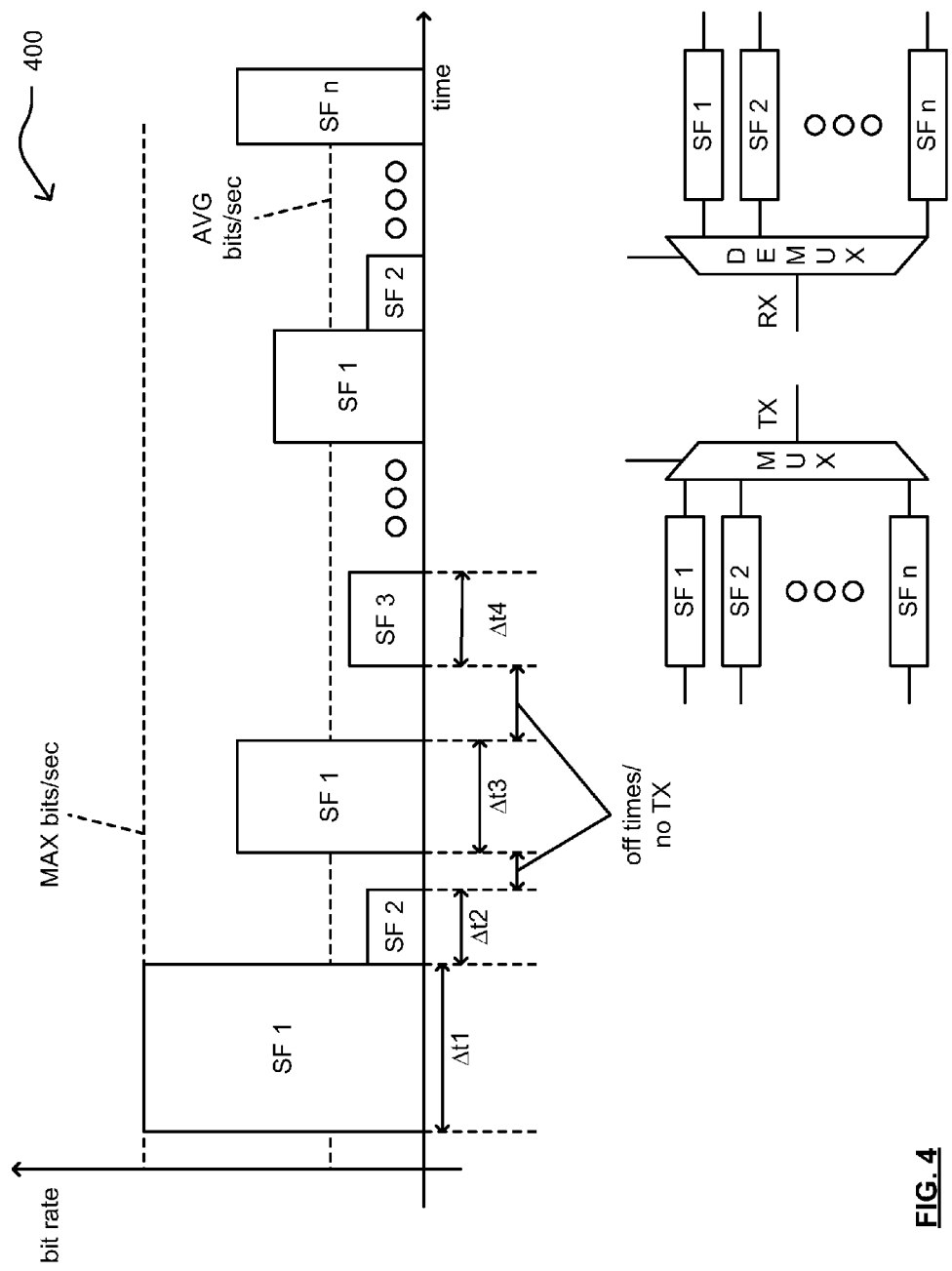
FIG. 4 is a diagram illustrating an example of time sliced or time multiplexed transmission of different service flows.

FIG. 4 is a diagram illustrating an example 400 of time sliced or time multiplexed transmission of different service flows. Communications may be provided to the device 110 using time slice broadcasting. Within such time slice broadcasting, information may be transmitted in bursts that are multiplexed as a function of time. The device 110 may be switched off entirely or operate in a reduced power mode, sleep mode, or power savings mode during inactive periods in which there are no bursts for time slices within the broadcast signal intended for the device 110. The different time slices may be of different time duration (e.g., t1, t2, etc.) and may also be delivered at different bit rates. The amount of information (bits or symbols) included within any burst or time slice may be calculated as the total area of the slice (e.g., the bits per second at which the burst or time slice is transmitted multiplied by the duration of the burst or time slice. Note that the data or symbol rate may vary as a function of time (e.g., see the maximum bit rate and average bit rate depicted in the diagram).

Different time slices may correspond to different service flows including those described with respect to the cable-based system of FIG. 2 (e.g., data, media such as video, audio, or graphic information, synchronization, control, etc.). Note also that a given service flow may include multiple time slices or bursts that are nonadjacent as a function of time. For example, a first service flow (SF 1) is shown as including three separate time slices in this diagram that are separated by time slices associated with two other service flows (SF 2 and SF 3). The device 110 can perform appropriate buffering, such as by using the memory 340, to store a received time slice to be demodulated, decoded, etc. as the device 110 has capability to do so.

The bottom portion of the diagram shows how multiple service flows may be time multiplexed to generate a time multiplexed transmit signal (TX) to be transmitted from one device to another via one or more communication links. Within a device that receives such a signal (RX) from a communication channel, time demultiplexing may be performed to partition the respective service flows. A device need only process those service flows intended for that device, and any service flow not intended for that device may be discarded. Note also that a device may operate not to receive all of the service flows transmitted via the communication channel. A device may be configured to receive and process only those time slices associated with those service flows of interest. For example, a device may be configured to receive and process only those time slices associated with the first service flow (SF 1). Note also that more than one service flow may be received and processed. The device may be configured to receive those time slices associated with a first service flow (e.g., SF 1) based on a first power mode, and the device may be configured to receive those time slices associated with a second service flow (e.g., SF 2) based on a second power mode. The device may achieve power savings by operating in a reduced power mode at certain times and receiving and processing only those time slices associated with a synchronization service flow (e.g., SF 3).

Time slice broadcasting has certain advantages when compared to frequency sliced broadcasting. Processing of signals provided using frequency slice broadcasting typically require high-Q bandpass filters to extract information contained within channels of various frequency bandwidth. Devices that include such high-Q bandpass filters often employ high-Q inductors or other relatively complex analog structures that can be highly consumptive of power. In contrast, time slicing allows for relatively low duty cycle operation. In addition, many communication standards (e.g., multimedia over coax alliance (MoCA®, or generally referred to as MoCA) network, Digital Video Broadcasting-H (DVB-H), etc.) specify operation based on burst transmissions thereby allowing for time slice broadcasting.

FIG. 5A is a diagram illustrating an example of a portion of a receiver 324 that includes an analog to digital converter (ADC). Receiver 324 implemented within communication interface 320 of device 110 may include a number of analog front end(AFE) components. For example, the receiver 324 may perform digital sampling of a received continuous-time signal using an analog to digital converter (ADC) to generate a digitized signal composed of a number of digital samples for subsequent processing. Digitally sampling a signal using a relatively higher number of bits requires a relatively lower noise floor and corresponding larger dynamic range than digitally sampling a signal using a relatively lower number of bits. For example, operating in ADC for digitally sampling a signal to get 10 bits can consume significantly more power than digitally sampling the signal to get 6 or even 8 bits.

Note also that any of a number of other operations may be performed using AFE components including filtering, gain adjustment, frequency conversion, etc. The device 110 may be configured to perform digital sampling differently at different times. For example, a first number of samples may be taken over a first time duration associated with a first dynamic range when operating in a first power mode. Then, a second number of samples may be taken over a second time duration associated with the second dynamic range when operating in a second power mode. The processor 330 may be configured to direct the ADC of the communication interface 320 to perform such digital sampling differently at different times.

FIG. 5B is a diagram illustrating another example of a portion of a receiver 324 that includes multiple ADCs. Note that more than one ADC may be implemented within the receiver 324 of device 110. For example, different ADCs may be implemented to sample different portions of the overall dynamic range of a given signal (e.g., an ADC 1 implemented to sample a first portion of the dynamic range, an ADC 2 implemented to sample a second portion of the dynamic range, etc.). Individual ADCs that are configured to sample smaller dynamic ranges may be much more cost-effective than a single ADC capable to sample a relatively large dynamic range.

Alternatively, depending upon which power mode in which dynamic range device 110 is operating, the received signal may be provided to one or more of the ADCs that are particularly implemented for that dynamic range. For example, the different ADCs may be separately operative for the different dynamic ranges (DR 1, DR 2, up to DR n) described with reference to FIG. 3. Depending upon which dynamic range device 110 is using, the received signal will be provided to the appropriate ADC that covers that particular dynamic range. Generally speaking, device 110 will include functionality to process received signals using different dynamic ranges corresponding to different power modes.

FIG. 5C is a diagram illustrating an example 501 of a digital sampling of a signal using different operational parameters. A portion of a signal is shown as being digitally sampled differently at different times. A first number of samples may be taken over a first time duration associated with a first dynamic range, and a second number of samples may be taken over a second time duration associated with the second dynamic range. The different dynamic ranges may be associated with different power modes. For example, the operational parameters used to perform the digital sampling on the left hand side of the diagram include a dynamic range that is relatively larger than the right hand side of the diagram. Different combinations of these operational parameters may be used to adapt and modify the manner by which digital sampling is performed within device 110.

FIG. 6A is a diagram illustrating an example of a portion of a communication interface 320 that includes multiple transceivers. Communication device 110 may include different transceivers to support communications for a different service flows. For example, a device's communication interface 320 may include a first transceiver (TX/RX) 610 configured to support communications for a first service flow (SF 1) and a second transceiver (TX/RX) 620 configured to support communications for a second service flow (SF 2). Generally, any desired number of transceivers may be included within a communication interface 320 to support communications for any desired number of service flows (e.g., up to an n-th transceiver (TX/RX) 630 configured to support communications for a first service flow (SF n)).

The processor 330 within a device 110 may be configured to coordinate operation for each of the various transceivers 610-630. In a first power mode, the device 110 may operate using transceiver 610 to support communications based on the first service flow. In a second power mode, the device 110 may operate using transceiver 620 to support communications based on the second service flow. One of these power modes and associated service flows (e.g., the second service flow (SF 2) may correspond to a reduced power or sleep mode relative to other power modes. The device 110 may operate using a relatively smaller dynamic range and corresponding relatively lower SNR when operating in the reduced power or sleep mode.

FIG. 6B is a diagram illustrating an example of a portion of a communication interface 320 that includes a main transceiver with one or more sub-transceivers. Communication device 110 may include a main transceiver (TX/RX) 631 configured to support communications for a first service flow (SF 1) and one or more other embedded transceivers or components to provide transceiver functionality for other service flows (e.g., embedded transceiver or components (TX/RX) 621 to support communications for a second service flow (SF 2)). Generally, any desired number of additional embedded transceivers or components providing transceiver functionality may be implemented within the main transceiver (TX/RX) 631 (e.g., an n-th transceiver or components (TX/RX) 641 configured to support communications for an n-th service flow (SF n)). One of these power modes and service flows supported by one of the embedded transceivers are components (e.g., the second service flow (SF 2)) that may correspond to a reduced power or sleep mode relative to other power modes (e.g., the first service flow (SF 1) that may be a full functionality or full power mode).

Note that the various service flows in FIGS. 6A and 6B may include any desired service flows including those described with respect to the cable-based system of FIG. 2 (e.g., data, media such as video, audio, or graphic information, synchronization, control, etc.). Note also that signaling provided via a service flow associated with the reduced power or sleep mode may be provided via a control channel having a relatively lower rates and lower ordered MCS when compared to signaling provided via a service flow associated with a full functionality or full power mode. For example, the device 110 may operate based on a relatively higher dynamic range and relatively higher SNR to perform successful demodulation and decoding of signaling provided via a service flow associated with the full functionality or full power mode (e.g., when receiving a service flow associated with data, telephony, television, Internet, media, etc.). Alternatively, the device 110 may operate based on a relatively smaller dynamic range and relatively lower SNR to perform successful demodulation and decoding of signaling provided via a service flow associated with a reduced power or sleep mode (e.g., synchronization, control signaling, etc.).

Figure 7A:
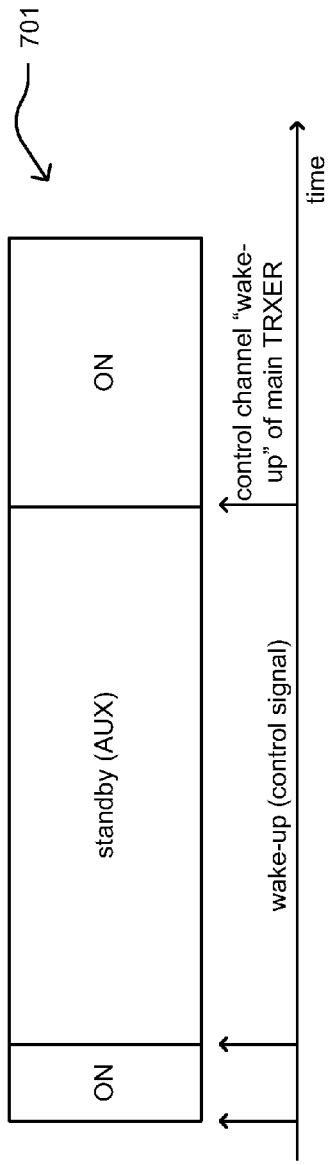
FIG. 7A is a diagram illustrating an example of transceiver wake up using a control channel.

FIG. 7A is a diagram illustrating an example 701 of transceiver wake up using a control channel. The device 110 may include multiple transceivers (e.g., separately implemented or embedded) to support communications for a number of service flows. One of the transceivers may operate as an auxiliary transceiver to receive control signaling via a control channel Generally, such control signaling is based on a reduced power sleep mode and also based on relatively lower rates and lower ordered MCS when compared to signaling provided for a full functionality or full power mode.

When such an auxiliary transceiver within the device 110 receives a control signal via such a control channel from another device, the processor 330 of the device 110 awakens another one of the transceivers within the device 110. The device 110 then awakens from the reduced power mode or the sleep mode to another power mode (e.g., a full functionality or full power mode). If desired, the processor 330 of the device 110 may direct the auxiliary transceiver to enter into an inactive state when the other one of the transceivers and the device is operating in the full functionality or full power mode. Alternatively, both the auxiliary transceiver and the other transceiver may be concurrently operational when the device is operating in the full functionality or full power mode.

Figure 7B:
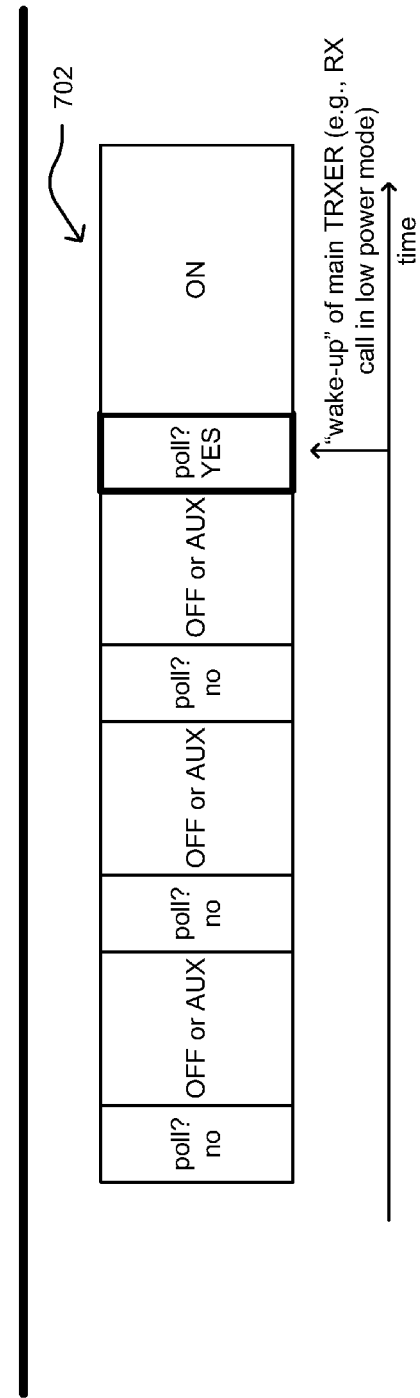
FIG. 7B is a diagram illustrating an example of transceiver wake up using a polling.

FIG. 7B is a diagram illustrating an example 702 of transceiver wake up using a polling. The device 110 may be configured to wake up a transceiver for use in full functionality or full power mode based on polling signaling received from another device. For example, a device may be configured to wake up in a relatively short period of time (e.g., a few microseconds (μsecs)).

For an example of operation, the device 110 may awaken periodically to check status of polling signals. In the diagram, the device 110 awakens to determine if a polling signal has been transmitted from another device. When no polling signal is detected, the device 110 may operate within a reduced power or sleep mode. For example, in an implementation that includes multiple transceivers, the device 110 may turn off completely or operate based on a reduced power mode to support communications as described above by an auxiliary transceiver. This process may continue as the device 110 checks for subsequent polling signals to determine if a polling signal has been transmitted from the other device. When the device 110 detects a polling signal has been transmitted to it, the device 110 may then wake up one of the transceivers implemented to support operation based on a full functionality or full power mode. One example of a polling signal may include an incoming voice over Internet protocol (VoIP) call received by a device when operating in a reduced power sleep mode. Another example of a polling signal may include a control signal received by an auxiliary transceiver via a control channel.

Significant power savings may be achieved for the device 110 when operating based on the various parameters described herein (e.g., different dynamic ranges, different power modes, different SNRs, different noise floors, different digital sampling, etc.). In one example, the device 110 may achieve the power savings of approximately 90% or more when in a reduced power. The device 110 may achieve even greater power savings when operating within a sleep mode and/or deep sleep mode). Also, with respect to embodiments that employ control channel signaling, note that such control channel signaling may be performed using in-band or out-of-band control channel signaling relative to the main channel signaling (e.g., for data, media, telephony, Internet, etc.). In-band signaling may be implemented using relatively more robust or lower ordered MCS for pilot tones (e.g., QPSK modulated pilot tones) to reduce or eliminate the impact to downstream spectral efficiency.

Note also that such power savings described herein is equally applicable to broadcast and non-broadcast downstream applications that may operate using a number of different power modes.

FIG. 8A is a diagram illustrating an embodiment of a method 801 for execution by one or more communication devices. The method 801 begins by operating a device to support first communications with another device based on a first power mode (block 810). The first power mode may have one or more associated operational parameters including a first dynamic range. The method 801 continues by operating the device to support second communications with the other device, or another device, based on a second power mode (block 820). The second power mode may also have one or more associated operational parameters including a second dynamic range that is different than the first dynamic range.

The device operates using different dynamic ranges for processing signals at different times. This process may continue using any of a number of power modes. For example, the method 801 may continue by operating the device to support n-th communications with one of the other devices based on an n-th power mode, which may be the first power mode, the second power mode, or another power mode such as an n-th power mode (block 830).

FIG. 8B is a diagram illustrating another embodiment of a method 802 for execution by one or more communication devices. The method 802 begins by operating a device to support communications with another device using a first transceiver (block 811). This first transceiver may be an auxiliary transceiver as described herein that communicates with another device via a control communication channel that uses a relatively lower rate, a relatively lower ordered MCS or modulation, etc. than a main communication channel. The method 802 continues by determining whether or not a control signal has been received by the first transceiver (decision block 821).

When no control signal from another device has been received by the first transceiver, the method 802 may end or alternatively continue performing the operations associated with block 811. When a control signal from the other device has been received by the first transceiver, the method 802 then operates by waking up a second transceiver of the device (block 831). This second transceiver may be a main transceiver in the device. FIG. 6A and FIG. 6B describe various architectures by which functionality associated with multiple transceivers may be implemented. The method 802 then operates the device to support communications with the other device, or even another device, using the second transceiver (block 841).

The present invention has been described herein with reference to at least one embodiment. Such embodiment(s) of the present invention have been described with the aid of structural components illustrating physical and/or logical components and with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims that follow. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

As may also be used herein, the terms "processing module," "processing circuit," "processing circuitry," and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module includes a processing module, a functional block, hardware, and/or software stored on memory for performing one or more functions as may be described herein. Note that, if the module is implemented via hardware, the hardware may operate independently and/or in conjunction with software and/or firmware. As also used herein, a module may contain one or more sub-modules, each of which may be one or more modules.

While particular combinations of various functions and features of the one or more embodiments have been expressly described herein, other combinations of these features and functions are likewise possible. The present disclosure of an invention is not limited by the particular examples disclosed herein and expressly incorporates these other combinations.

What is claimed is:

1. A communication device comprising:
 a communication interface configured to support communications with another communication device based on a plurality of dynamic ranges and based on time slice broadcasting; and
 a processor configured to:
  direct the communication interface to operate based on a first power mode that uses a first dynamic range of the plurality of dynamic ranges when the communication interface receives a first burst of the time slice broadcasting; and
  direct the communication interface to operate based on a second power mode that uses a second dynamic range of the plurality of dynamic ranges that is smaller than the first dynamic range when the communication interface receives a second burst of the time slice broadcasting.

2. The communication device of claim 1, wherein the communication interface is further configured to:

receive the first burst of the time slice broadcasting based on a first service flow provided from the another communication device at a first rate and the second burst of the time slice broadcasting based on a second service flow provided from the another communication device at a second rate that is lower than the first rate.

3. The communication device of claim 1, wherein the communication interface includes an analog to digital converter (ADC) configured to:
perform digital sampling of the communications based on the first dynamic range using a first number of bits; and
perform digital sampling of the communications based on the second dynamic range using a second number of bits that is fewer than the first number of bits.

4. The communication device of claim 1 further comprising:
a cable modem, wherein the another communication device is a cable headend transmitter or a cable modem termination system (CMTS).

5. The communication device of claim 1, wherein the communication interface is further configured to:
support the communications within at least one of a satellite communication system, a wireless communication system, a wired communication system, a fiber-optic communication system, or a mobile communication system.

6. A communication device comprising:
a first transceiver configured to support first communications with another communication device based on a first power mode that uses a first dynamic range, wherein the first transceiver includes a first analog to digital converter (ADC) configured to perform digital sampling of the first communications based on the first dynamic range using first number of bits;
a second transceiver configured to support second communications with the another communication device when the first transceiver operates in a reduced power mode or a sleep and based on a second power mode that uses a second dynamic range that is smaller than the first dynamic range, the second transceiver includes a second ADC configured to perform digital sampling of the second communications based on the second dynamic range using a second number of bits that is fewer than the first number of bits; and
a processor configured to awaken the first transceiver from the reduced power mode or the sleep mode to the first power mode when the second transceiver receives a control signal from the another communication device.

7. The communication device of claim 6 further comprising:
a cable modem, wherein the another communication device is a cable headend transmitter or a cable modem termination system (CMTS).

8. The communication device of claim 6, wherein at least one of the first transceiver or the second transceiver is further configured to:
support the communications within at least one of a satellite communication system, a wireless communication system, a wired communication system, a fiber-optic communication system, or a mobile communication system.

9. A method for execution by a communication device, the method comprising:
via a communication interface of the communication device, supporting first communications with another communication device based on a first power mode that uses a first dynamic range of a plurality of dynamic ranges and based on the first power mode when receiving a first burst of a time slice broadcast; and
via the communication interface of the communication device, supporting second communications with the another communication device based on a second power mode that uses a second dynamic range of the plurality of dynamic ranges that is smaller than the first dynamic range and based on the second power mode when receiving a second burst of the time slice broadcast.

10. The method of claim 9 further comprising:
operating an analog to digital converter (ADC) of the communication interface to perform digital sampling of the first communications based on the first dynamic range using a first number of bits; and
operating the ADC of the communication interface to perform digital sampling of the second communications based on the second dynamic range using a second number of bits that is fewer than the first number of bits.

11. The method of claim 9, wherein the communication device is a cable modem, and the another communication device is a cable headend transmitter or a cable modem termination system (CMTS).

12. The method of claim 9 further comprising:
operating the communication interface of the communication device to support at least one of the first communications or the second communications within at least one of a satellite communication system, a wireless communication system, a wired communication system, a fiber-optic communication system, or a mobile communication system.

13. A communication device comprising:
a communication interface configured to support communications with another communication device based on a plurality of dynamic ranges, wherein the communication interface includes a first transceiver configured to support first communications based on a first service flow with the another communication device and a second transceiver configured to support second communications based on a second service flow with the another communication device; and
a processor configured to:
direct the communication interface to operate based on a first power mode that uses a first dynamic range of the plurality of dynamic ranges; and
direct the communication interface to operate based on a second power mode that uses a second dynamic range of the plurality of dynamic ranges that is smaller than the first dynamic range.

14. The communication device of claim 13, wherein the processor is further configured to:
awaken the second transceiver from a reduced power mode or a sleep mode to the first power mode when the first transceiver receives a control signal from the another communication device via a control channel.

15. The communication device of claim 13, wherein the communication interface is further configured to:
support the communications within at least one of a satellite communication system, a wireless communication system, a wired communication system, a fiber-optic communication system, or a mobile communication system.

16. A communication device comprising:
a first transceiver configured to support first communications with another communication device based on a first power mode that uses a first dynamic range and based on a first service flow with the another communication device that has a first rate;

a second transceiver configured to support second communications with the another communication device when the first transceiver operates in a reduced power mode or a sleep and based on a second power mode that uses a second dynamic range that is smaller than the first dynamic range and based on a second service flow with the another communication device that includes synchronization with the another communication device via a control channel that has a second rate that is lower than the first rate; and a processor configured to awaken the first transceiver from the reduced power mode or the sleep mode to the first power mode when the second transceiver receives a control signal from the another communication device.

17. The communication device of claim 16, wherein at least one of the first transceiver or the second transceiver is further configured to:

support the communications within at least one of a satellite communication system, a wireless communication system, a wired communication system, a fiber-optic communication system, or a mobile communication system.

18. A method for execution by a communication device, the method comprising:

via a communication interface of the communication device, supporting first communications with another communication device based on a first power mode that uses a first dynamic range of a plurality of dynamic ranges;

via the communication interface of the communication device, supporting second communications with the another communication device based on a second power mode that uses a second dynamic range of the plurality of dynamic ranges that is smaller than the first dynamic range;

operating a first transceiver of the communication device to support the first communications based on a first service flow with the another communication device; and operating a second transceiver of the communication device configured to support the second communications based on a second service flow with the another communication device.

19. The method of claim 18 further comprising:

awakening the second transceiver from a reduced power mode or a sleep mode to the first power mode when operating the first transceiver to receive a control signal from the another communication device via a control channel.

20. The method of claim 18 further comprising:

operating the communication interface of the communication device to support at least one of the first or second communications within at least one of a satellite communication system, a wireless communication system, a wired communication system, a fiber-optic communication system, or a mobile communication system.

* * * * *